April 26, 1966  F. M. AFRICANO ETAL  3,247,734
PRECISION ANGULAR TRANSFER COUPLING DEVICE
Filed Feb. 12, 1964  2 Sheets-Sheet 1
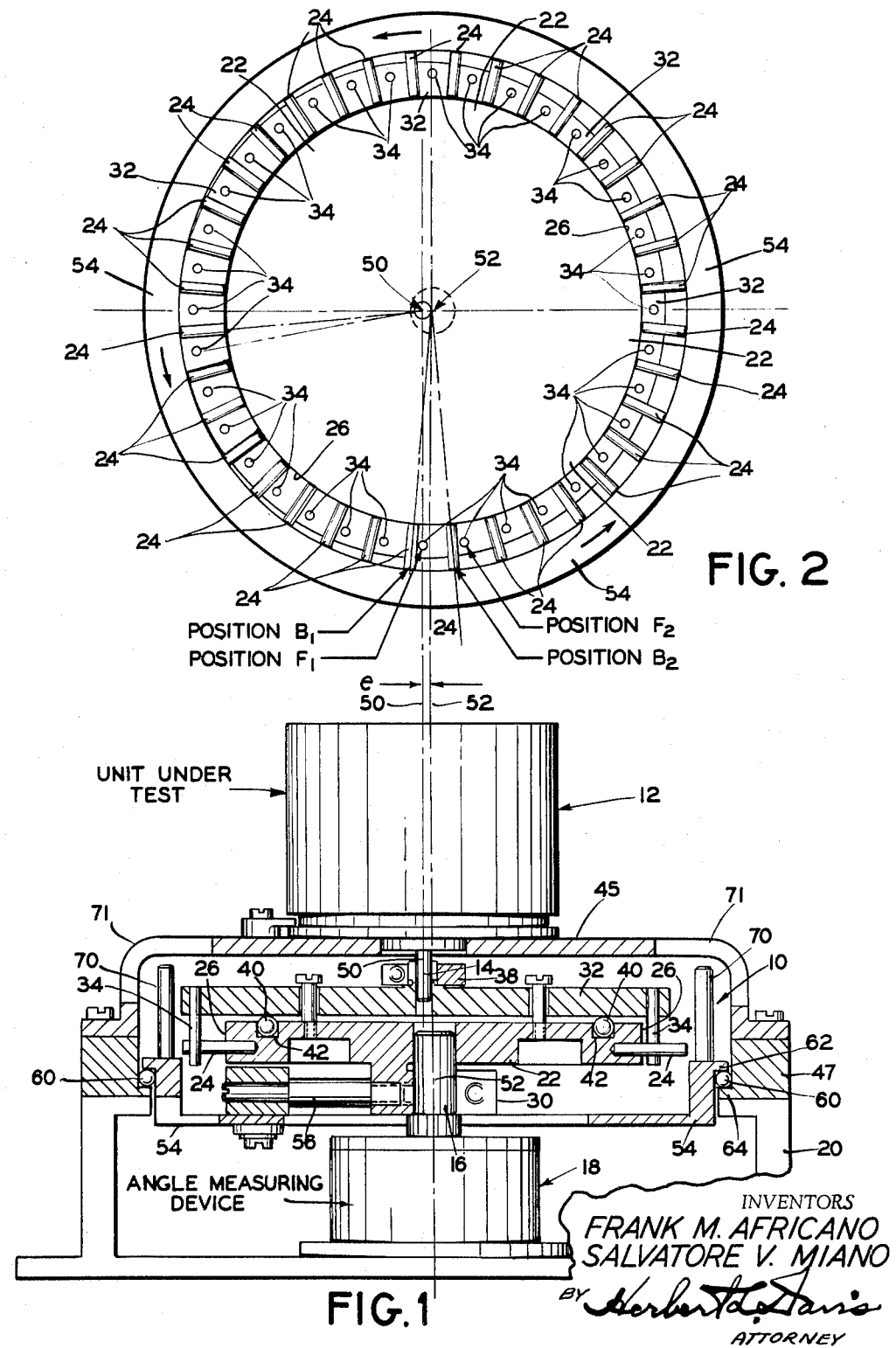

INVENTORS
FRANK M. AFRICANO
SALVATORE V. MIANO

United States Patent Office 3,247,734
Patented Apr. 26, 1966

3,247,734
PRECISION ANGULAR TRANSFER
COUPLING DEVICE
Frank M. Africano, Maywood, N.J., and Salvatore V.
Miano, Brooklyn, N.Y., assignors to The Bendix Corporation, Eclipse-Pioneer Division, Teterboro, N.J., a corporation of Delaware
Filed Feb. 12, 1964, Ser. No. 344,293
3 Claims. (Cl. 74—112)

This invention relates to a precision angular transfer coupling device and more particularly to a device for transmitting precision rotary motion from one shaft to another shaft without being affected by the usual manufacturing errors of axial, angular and lateral misalignment of the shafts.

The coupling device may be used in connection with a variety of test equipment to meet the requirements relative to synchros, resolvers, shaft encoders, decoders, computers, radar positioning mechanisms and other automatic units. The need of such a coupling device is recognized for meeting the requirements for precision angular transfer of rotational motion in connection with the testing of the aforenoted equipment. Heretofore, a unit under test in a standard angle measuring test stand used a flexible bellows or a pin and yoke arrangement, or a combination thereof. Each of these prior coupling arrangements introduced undesirable and unavoidable errors in the test reading.

An object of the invention is to provide a coupling device in which there is effected for use in testing such equipment a known, controlled, and varying error, thereby minimizing the undesirable error contributed by the flexible coupling by the prior coupling devices such as the flexurally coupled or pin and yoke arrangement.

Another object of the invention is to provide a coupling device in which there is no direct connection between the shaft of the unit such as a resolver or synchro under test and the shaft of the test stand so as to thereby eliminate the effect of the mutual interaction which has heretofore occurred in coupling devices under flexible coupling or in a yoke arrangement type so as to provide test readings which may have greater accuracy.

Another object of the invention is to provide a precision angular transfer coupling device in which the rotary shaft of the unit under test is deliberately offset from the rotary shaft of the test stand by a predetermined value.

Another object of the invention is to provide a novel precision coupling device in which there is provided a disc having a plurality of pins extending radially along the periphery and spaced equiangularly and arranged to cooperate with a plurality of pins projecting from a second disc equal in number to the pins of the first disc and protruding at equiangular intervals with the face of the second disc at a radius such that they extend into the circular path of the first disc, and in which the first disc is centered by the axis of the unit under test while the second disc is centered about an axis of a shaft of the measuring device and as a consequence, the pins of the first disc selectively drive the pins of the second disc through an angle numerically equal to the angle between two adjacent pins on the discs. The bisector of this angle is at right angles with the direction of the offset of the shaft of the unit under test from that of the shaft of the measuring device.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is to be had to the appended claims for this purpose.

In the drawings:

FIGURE 1 is a sectional view of a precision angle transfer coupling device embodying the invention and operatively arranged between a unit to be tested and an angle measuring device.

FIGURE 2 is a top plan view showing the schematic relationship of the driven pins carried by the disc of the unit under test and the cooperating driving pins of the disc carried by the shaft of the measuring device.

Figure 3:
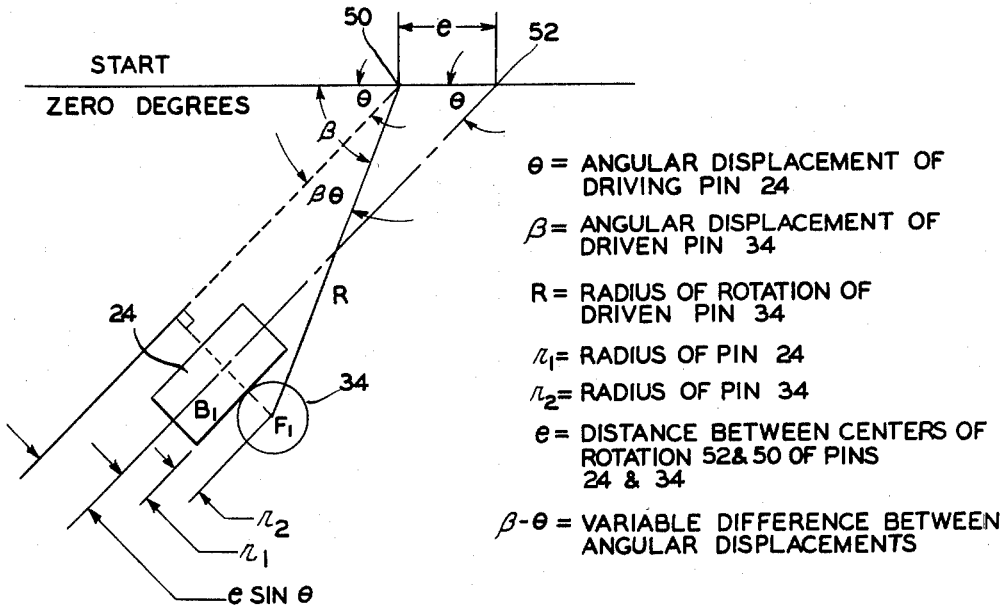
FIGURE 3 is a diagrammatic view illustrating the development of a general equation in the operation of the coupling device.

Referring to the drawing of FIGURE 1, a precision angular transfer coupling device, indicated generally by the numeral 10, is arranged to operatively connect a unit under test, such as a synchro or resolver 12, having a rotatable shaft 14 with a shaft 16 of an angle measuring device 18 mounted on a test stand 20.

The precision angular coupling device 10 includes a disc 22 having a plurality of driving pins 24 extending radially from the periphery 26 of the disc 22 and spaced equiangularly thereon. In the present illustration of the invention, there are shown thirty-six driving pins 24 which are equiangularly spaced ten degrees (10°) apart. The number of driving pins 24 may be varied in which case the angle of difference will vary to meet the required three hundred and sixty degrees (360°) of the disc 22.

The disc 22 is provided with a clamp 30 for fastening the disc 22 to the shaft 16 of the measuring device 18 mounted on test stand 20.

There is further provided a second disc 32 having a plurality of pins 34 equal in number to the pins 24 and protruding at equiangular intervals from the face of the disc 32 at a radius such that they extend into the circular path of the driving pins 24. The disc 32 is provided with a clamp 38 fastened to the shaft 14 of the unit 12 to be tested such as a synchro or resolver. The disc 32 floats on a series of bearing balls 40 which roll in a channel 42 in the disc 22.

The housing of the unit 12 under test is mounted on a pedestal 45 which is fastened to frame 47 of the test stand 20. The unit 12 under test is centered about a center 50 of the shaft 14 of the unit 12 which is offset a predetermined distance $e$ from the center 52 of the rotary shaft 16 of the measuring device 18 and in a radial direction at right angles with the direction of the pin 34 at position $F_1$ where it is acted upon by the driving pin 24 at position $B_1$. The disc 22 which carries the driving pins 24 rotates about the center 52, while the disc 32 which carries the driven pins 34 rotates about the center 50. Rotation of the driving disc 22 is accomplished as follows: the disc 22 is connected to a supporting ring 54 through a rod 56. The ring 54 rotates on bearing balls 60 which roll between a flange portion 62 of the ring 54 and a flange portion 64 of the frame 47. Pins 70 project from the ring 54 and are accessible through suitable openings 71 in the frame 47 so that the pins 70 may be manually actuated or may be driven by suitable mechanical means in such a manner as to propel the ring 54, the shaft 16, and the disc 22. The disc 22, as shown, rotates about the center 52 of the shaft 16 of the resolver test stand 20.

The rotation of the ring 54 causes the pins 24 to drive the pins 34 as previously indicated. As a consequence, disc 32 which carries the shaft 14 of the unit 12 under test rotates about the offset center 50 and the condition of the pin 24 at position $B_1$ driving pin 34 at position $F_1$ repeats itself as each pair of succeeding pins assumes its relative positions at $B_1$ and $F_1$, respectively. Pins 24 drive pins 34 only in the vicinity of the positions $B_1$ and $F_1$ and through an angle numerically equal to the angle between the two adjacent pins 24 and 34 on the discs 22 and 32. The bisector of this angle is at right angles with the direction of offset of the unit 12 under test. At all other positions, the pins 24 and 34 are not in contact.

The change in angular displacement between the pins 24 and 34 in traversing the aforementioned angle is less than at any other position. The difference in angular displacement, for example, is in the order of plus or minus one second of arc for thirty-six pins per disc, operating at a radius of 2¾ inches, and an offset $e$ of 0.005 inch.

Mathematical equations

Referring to FIGURE 3, there is illustrated a mathematical analysis of operation of the coupling device in which pin 24 of radius $r_1$ revolves about the center 52 and which pin 24 in position $B_1$ drives in position $F_1$ the pin 34 of radius $r_2$ which revolves at a radius R about the center 50 of the unit 12 under test and at a distance $e$ from the center 52 of the measuring device 18. The pin 34 is thus driven through angle B while the driving pin 24 travels through an angle $\theta$. The geometry of FIGURE 3 indicates the following relationship:

$$\sin (B-\theta) = \frac{e \sin \theta + r_1 + r_2}{R}$$

general equation angular difference $B-\theta$ is a maximum or minimum when the derivative of $\sin (B-\theta) = 0$
i.e., $$d[\sin (B-\theta)] = \frac{e}{R} \cos \theta = 0$$

$\cos \theta = 0$
$\theta = 90°$ where $B-\theta$ is maximum, or
$\theta = 270°$ where $B-\theta$ is minimum.

Illustration by numerical example:

given $r_1 = r_2 = .0625''$
$e = .005''$
$R = 2.75''$ substituting in the above general equation, when $\theta = 90°$, $B-\theta = 2°42'34.3''$ (max.)
when $\theta = 270°$, $B-\theta = 2°30'3.5''$ (min.)

The arrangement of the coupling device and the direction of operation thereof is such that the pins 24 drive pins 34 only in the vicinity of $\theta = 90°$ and not in the vicinity of $\theta = 270°$ which need not be given further consideration.

Operation

If there were only one pin 24 and one pin 34, a single pair of pins 24 and 34 would be in constant driving contact throughout the 360° cycle, but when there are a number of driving pins 24, as in the present invention, spaced equiangularly about the center 52 of the angle measurement device 18 and having an equal number of driven pins 34 similarly distributed about the center 50 of the unit 12 under test, there is a sequential event of one pin 24 driving a pin 34 while the remainder of the pins 24 and 34 are either discretely approaching contact or are departing from contacting relation following the driving contact.

The angular period through which a pin 24 drives a pin 34 is a function of the number of pins in the device. For instance, if thirty-six equally spaced pins 24 and 34 are used in each rotating member 22 and 32, the angular period of contact is 360/36 or 10°. This angle of duration of contact is symmetrical about an axis through center 52 and at right angle with the common axis through centers 50 and 52.

Figure 4:
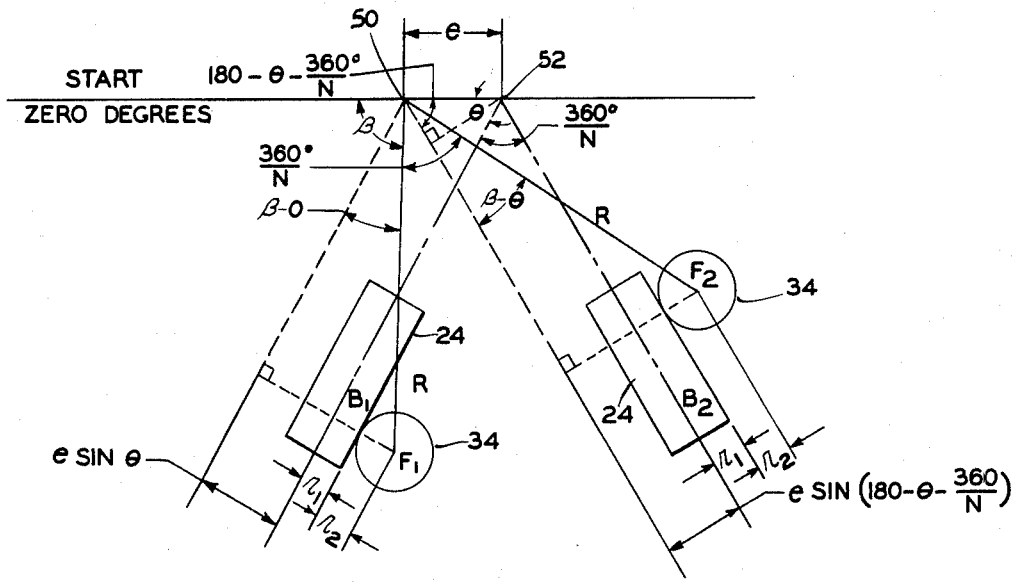
FIGURE 4 is a schematic illustration showing the development of the angular range in which the difference in angular displacements $B-\theta$ varies the least.

Referring to FIGURE 4, the pin 24, shown in position $B_1$ has been displaced through an angle $\theta$ before it comes in contact with the pin 34 at the position $F_1$. The pins 24 and 34 at positions $B_2$ and $F_2$ are a pair of pins adjacent to the pins 24 and 34 at the positions $F_1$ and $B_1$ each spaced 360/N from its neighboring pin in which N is the number of pins in each group.

It will be seen from the geometry of FIGURE 4 that the following equations may be obtained:

$$\sin (B-\theta) = \frac{e \sin \theta + r_1 + r_2}{R} = \frac{e \sin \left(180 - \theta \frac{360}{N}\right) + r_1 + r_2}{R}$$

after cancellation $$\sin \theta = \sin \left(180 - \theta - \frac{360}{N}\right)$$

$$\theta = 180 - \theta - \frac{360}{N}$$

$$2\theta = 180 - \frac{360}{N}$$

$$\theta = 90 - \frac{180}{N}$$

when N = 36 pins, $\theta = 90 - 5 = 85°$ and $$\theta + \frac{360}{N} = 95°$$

These results indicate that after pin 24 has been displaced 85°, pin 24 in the position $B_1$ has just come in contact with pin 34 in the position $F_1$ at the same moment that pin 24 in the position $B_2$ (after a displacement of 95°) is being separated from pin 34 in the position $F_2$.

The numerical example will demonstrate some pertinent criteria. Thus, in the case of the numerical values of $r_1$, $r_2$, $e$ and R heretofore given, when the angular displacement of driving pin 24 is $\theta = 90°$, the difference in displacements between the driving pin 24 and the driven pin 34 is $B-\theta = 2°42'34.3''$ (when $\theta = 90°$)

At angular displacements of $\theta = 85°$ and $\theta = 95°$ the difference is $B-\theta = 2°42'32.9''$ (when $\theta = 85°$, or $\theta = 95°$)

within a displacement of 10° (between 85° and 95°) the angular difference has changed only $2°42'34.3'' - 2°42'32.9'' = 1.4$ seconds of arc.

A comparison then of angular displacements between driving pins 24 whose center of rotation is at 52 and the driven pins 34, whose center of rotation is at 50 and located for example, .005 inch away can disagree by a maximum of only 1.4 seconds of arc under these numerical conditions. The angular difference can be reduced to 1.0 seconds of arc by having the pins operate at a radius of $R = 4$ inches. It can be further reduced by increasing the value of radius R and/or decreasing the offset distance $e$. The range of variation of offset distance $e$ is limited by the clearance of the rotating elements 22 and 32.

Further, reductions may be attainable by the introduction of additional discs 22 and 32 in the system.

Moreover by confining the contacting relation between the driving pin 24 and the driven pin 34 to the same range of positions between $B_1$, $F_1$ and $B_2$, $F_2$, there will be adhered to a minimum error of rotary transmission which consistently occurs at a certain point and which in the given example will be ninety degrees (90°) away from a line drawn through the two shaft centers 50 and 52, i.e. the center 50 of the shaft 14 of the unit 12 under test and the center 52 of the shaft 16 of the angle measuring device 18.

Although only one embodiment of the invention has been illustrated and described, various changes in the form and relative arrangements of the parts, which will now appear to those skilled in the art may be made without departing from the scope of the invention. Reference is therefore, to be had to the appended claims for a definition of the limits of the invention.

What is claimed is:

1. In a coupling device for use with test equipment for meeting the requirements of precision angular transfer of rotational motion from a first shaft of an angular measuring device to a second shaft of a device under test and in which said first shaft has an axis of rotation arranged in eccentric relation to an axis of rotation of the other shaft; said coupling device comprising a pair of circular discs, one of said circular discs being operatively connected to one of said shafts and the other of said pair of circular discs being operatively connected to the other of said shafts, the one circular disc including a plurality of pins projecting at equiangular relation from the one circular disc and radially extending about the axis of rotation of the one shaft, the other circular disc including a plurality of pins equal in number to the pins of the one circular disc and projecting from a face of the other circular disc, the plurality of pins of said other circular disc being arranged in an equiangular relation about the axis of rotation of the other shaft, and the pins of one of said plurality being so arranged in relation to the pins of said other plurality that each of the pins of the one plurality sequentially contacts in driving relation a corresponding pin of the other plurality.

2. In a coupling device for use with test equipment for meeting the requirements of precision angular transfer of rotational motion from a first shaft of an angular measuring device to a second shaft of a device under test and in which said first shaft has an axis of rotation arranged in eccentric relation to an axis of rotation of the other shaft; said coupling device comprising a pair of circular discs, one of said circular discs being operatively connected to one of said shafts and the other of said pair of circular discs being operatively connected to the other of said shafts, the one circular disc including a plurality of pins projecting at equiangular relation from the one circular disc and radially extending about the axis of rotation of the one shaft, the other circular disc including a plurality of pins equal in number to the pins of the one circular disc and projecting from a face of the other circular disc, the plurality of pins of said other circular disc being arranged in an equiangular relation about the axis of rotation of the other shaft, and the pins of one of said plurality being so arranged in relation to the pins of said other plurality that each of the pins of the one plurality sequentially contacts in driving relation a corresponding pin of the other plurality including a frame for said coupling device, a ring surrounding one of said discs, means drivingly connecting said ring to said one disc, roller bearings rotatably mounting the ring within the frame, and other roller bearings mounted between said circular discs for rotatably mounting the discs in relation one to the other.

3. In a coupling device for use with test equipment for meeting the requirements of precision angular transfer of rotational motion from a first shaft of an angular measuring device to a second shaft of a device under test and in which said first shaft has an axis of rotation arranged in eccentric relation to an axis of rotation of the other shaft; said coupling device comprising a pair of circular discs, one of said circular discs being operatively connected to one of said shafts and the other of said pair of circular discs being operatively connected to the other of said shafts, the one circular disc including a plurality of pins projecting at equiangular relation from the one circular disc and radially extending about the axis of rotation of the one shaft, the other circular disc including a plurality of pins equal in number to the pins of the one circular disc and projecting from a face of the other circular disc, the plurality of pins of said other circular disc being arranged in an equiangular relation about the axis of rotation of the other shaft, and the pins of one of said plurality being so arranged in relation to the pins of said other plurality that each of the pins of the one plurality sequentially contacts in driving relation a corresponding pin of the other plurality, including a frame for said coupling device, a ring surrounding one of said discs, means drivingly connecting said ring to said one disc, roller bearings rotatably mounting the ring within the frame, other roller bearings mounted between said circular discs for rotatably mounting discs in relation one of the other, and pins projecting from the ring and accessible through the frame for rotatably propelling the ring and said one circular disc through said connecting means.

References Cited by the Examiner

UNITED STATES PATENTS 2,427,724   9/1947   Haynes _____ 74—112

BROUGHTON G. DURHAM, *Primary Examiner.*

J. A. MATHEWS, *Assistant Examiner.*